US00RE42819E

(19) United States
(12) Reissued Patent
Lallouet et al.

(10) Patent Number: US RE42,819 E
(45) Date of Reissued Patent: Oct. 11, 2011

(54) CONNECTION TERMINATION FOR A SUPERCONDUCTIVE CABLE

(75) Inventors: Nicolas Lallouet, Fiennes (FR); Sebastian Delplace, Ardres (FR)

(73) Assignee: Nexans, Paris (FR)

(21) Appl. No.: 12/582,350

(22) Filed: Oct. 20, 2009

Related U.S. Patent Documents

Reissue of:
(64) Patent No.: 7,547,846
Issued: Jun. 16, 2009
Appl. No.: 11/715,271
Filed: Mar. 7, 2007

(30) Foreign Application Priority Data

Mar. 31, 2006 (FR) ..... 06 51144

(51) Int. Cl.
*H01R 4/00* (2006.01)

(52) U.S. Cl. ..... 174/84 R; 174/85; 174/88 R

(58) Field of Classification Search ..... 174/74 R, 174/74 A, 75 R, 75 F, 80, 84 R, 84 S, 85, 174/88 R, 90
See application file for complete search history.

(56) References Cited

U.S. PATENT DOCUMENTS

| | | | | |
|---|---|---|---|---|
| 6,112,531 | A * | 9/2000 | Yamaguchi | 62/51.1 |
| 7,067,739 | B2 * | 6/2006 | Ashibe et al. | 174/84 R |
| 2003/0040439 | A1 * | 2/2003 | Castiglioni et al. | 505/100 |
| 2005/0061537 | A1 | 3/2005 | Yumura et al. | 174/125.1 |

FOREIGN PATENT DOCUMENTS

GB 2350495 11/2000

OTHER PUBLICATIONS

French Search Report—Nov. 16, 2006.
Cryogenics—vol. 32, Issue 10, 1992, pp. 885-894—Abstract.

* cited by examiner

*Primary Examiner* — William H Mayo, III
(74) *Attorney, Agent, or Firm* — Sofer & Haroun, LLP

(57) ABSTRACT

A termination for connecting one end of a superconductive cable (10), wherein the end of the superconductor is made up of at least one resistively-conductive central support (12) of substantially cylindrical shape and disposed around the support, and wherein an insulating sheath (18) surrounds the superconductor. The end of the cable is stripped in order to reveal the central support (12) and the superconductor (14, 16), and the termination has a metal sleeve (30) made up of two portions adjacent in succession, wherein a first portion (32) is engaged around the stripped portion of the central support, and a second portion (34) is soldered around the stripped portion of the superconductor.

21 Claims, 1 Drawing Sheet

CONNECTION TERMINATION FOR A SUPERCONDUCTIVE CABLE

Matter enclosed in heavy brackets [ ] appears in the original patent but forms no part of this reissue specification; matter printed in italics indicates the additions made by reissue.

RELATED APPLICATION

This application is related to and claims the benefit of priority from French Patent Application No. 06 51144, filed on Mar. 31, 2006, the entirety of which is incorporated herein by reference.

FIELD OF THE INVENTION

The present invention relates to a connection termination for a superconductive cable having an electrical conductor such as a solid current lead for a conventional electric cable. The invention applies most particularly to high voltage.

BACKGROUND

A superconductive cable essentially comprises a central support, generally of cylindrical shape, having a superconductive material wound thereabout, and an insulating sheath placed around the superconductor. The central support is constituted by a material that conducts electricity, but that is not superconductive. For example it may be a copper tube or cable. The superconductive material may be in the form of a tape wound around the central support in one or more layers. Because of the almost zero resistivity of the superconductive material, the outside diameter of the central support is relatively small. However, the resistivity of a non-superconductive cable is much higher (such a cable is referred to below as a "resistive" cable, even though its resistivity may be very small, such as that of copper, for example). As a result, in order to convey an electric current of determined magnitude, it is necessary to use a cable of section that is much greater when the cable is resistive than when the cable is superconductive. It is therefore necessary to have a special connection in order to connect a resistive cable to a superconductive cable.

In order to conserve the characteristics of the superconductive cable, the connection must not damage it. The connection must also provide good continuity for conveying electric current. It is also preferable for the connection to be capable of being disconnected and reconnected easily, without it being necessary to cut off a portion of cable, for example if the resistive cable or the superconductive cable needs to be replaced. In addition, given that in the event of a short circuit the superconductive cable loses its superconductivity properties, in which case the current passes via the central conductor, which is resistive, the connection must be designed to take account of the possibility of such an operating incident.

OBJECTS AND SUMMARY

The present invention proposes a solution to the problem of connecting a superconductive cable to a resistive electric cable, that satisfies the requirements specified above.

More precisely, the invention provides a termination for connecting one end of a superconductive cable to a conventional electrical conductor that is not superconductive, said end being made up of at least one resistively-conductive central support of substantially cylindrical shape, of a superconductor disposed around the support, and of an insulating sheath surrounding the superconductor, this end of the cable being stripped to reveal the superconductor, and a length of the stripped superconductor being removed so as to reveal the central support, which termination is characterized in that it comprises a metal sleeve made up of two successive portions that are adjacent end to end, a first portion being engaged around the visible portion of the central support, and a second portion being soldered around the visible portion of the superconductor.

Advantageously, the second portion of the sleeve includes an orifice enabling a solder material to be introduced into the space situated between the stripped portion of the superconductor and the inside wall of the second portion of the sleeve.

Preferably, the solder material has a relatively low melting point, less than 100° C., such as for example an Sn—Bi—Pb alloy.

In an embodiment, the second portion of the sleeve includes electrical contact means on the outside surface of the sleeve, which may be constituted by grooves of annular shape for receiving metal contact strips.

In another embodiment, the first portion of the sleeve comprises first and second elements of substantially cylindrical shape, the diameter of the second element being greater than the diameter of the first element, together with an intermediate portion of frustoconical shape situated between the first and second elements, the diameter of the large base of the frustoconical portion being substantially equal to the diameter of the second element, and the diameter of the small base of the frustoconical portion being substantially equal to the diameter of the first element, which first element is engaged around the stripped portion of the central support.

The sleeve is advantageously made of copper, and is preferably silver-plated.

BRIEF DESCRIPTION OF THE DRAWINGS

Other advantages and characteristics of the invention appear from the following description of embodiments of the invention given as non-limiting examples, with reference to the accompanying drawing, in which.

DETAILED DESCRIPTION

Figure 1:
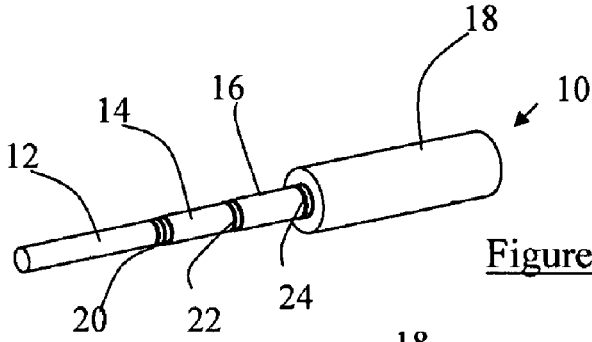
FIGS. 1, 2, and 3 show a first embodiment of the invention.

The end 10 of the cable shown diagrammatically in FIG. 1 is constituted by an electrically conductive central support 12 that is substantially cylindrical in shape. By way of example, this support may be a cable of copper wires or a metal tube of low resistivity, being made of copper or silver-plated copper, for example. Two superposed layers 14 and 16 of a superconductive material surround the central support 12. An electrically insulating sheath 18 surrounds the superconductive layer 16.

Intermediate layers 20, 22, and 24 are interposed respectively between the support 12 and the layer 14, between the two superconductors 14 and 16, and between the superconductor 16 and the sheath 18. The presence of these intermediate layers is advantageous, but nevertheless it is not essential. They may be made for example of carbon black or using stainless steel tape wound around the central support 12 and the superconductors 14 and 16.

The superconductive layers 14 and 16 may be formed by tapes or wires of superconductive material wound respectively about the intermediate layers 20 and 22. More generally, the cable could have only one superconductor 14 or 16. By way of example, the superconductive wires or tapes may be of the BSCCO ($Bi_2Sr_2Ca_2Cu_3O_x$) type or of the YBaCuO type.

The end 10 of the cable is stripped to constitute a staircase configuration, causing the following to appear in succession starting from the cable and extending over a length that can vary: the superconductive layer 16; the superconductive layer 14; and then the central support 12. The intermediate layers 20, 22, and 24 are practically not left visible, as shown in FIG. 1.

Figure 2:
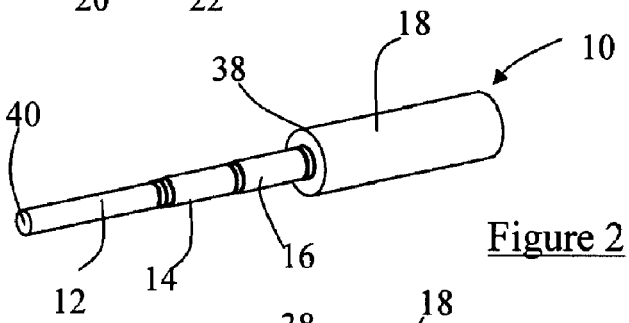
Figure 3:
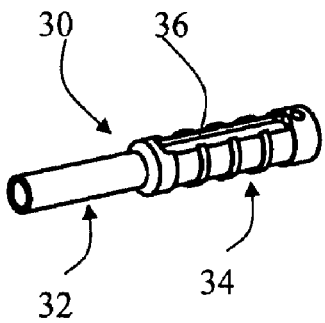
Figure 3:
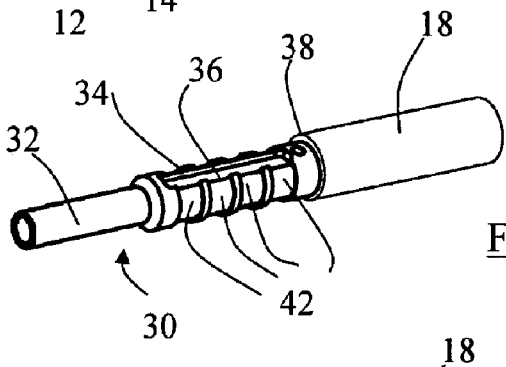
Figure 4:
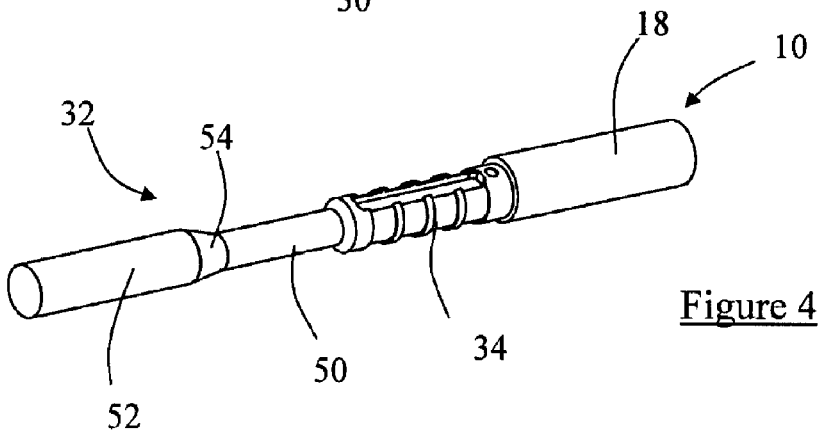
FIG. 4 shows a second embodiment.

A metal sleeve 30 (FIGS. 2 and 3) is fitted over the stripped central portion 12 and the stripped superconductive layers 14 and 16. The sleeve comprises first and second portions 32 and 34 placed end to end. The first portion 32 is in the form of a hollow cylinder of inside diameter that is very slightly greater than the diameter of the support 12, such that the first portion 32 of the sleeve can be fastened on the visible portion of the support 12 merely by being mutually engaged or crimped. By way of example, the sleeve may be made of copper, and when the central support is also made of copper, this procures a good copper-on-copper electrical connection. The copper may also be silver-plated. The second portion 34 of the sleeve is substantially in the form of a hollow cylinder of length not less than the length of the visible strip portions of the superconductive layers 14 and 16 so as to cover them completely. The inside diameter of the second portion 34 of the sleeve is greater than the diameter of the superconductive layer 16 (which has a diameter greater than that of the conductive layer 14) so that a gap is left between the inside wall of the second portion 34 of the sleeve and the superconductors 14 and 16. An orifice 36 is pierced through the second portion 34, which orifice is of dimensions that are sufficient to enable a powder of solder material to be poured through said orifice 36, or to enable a molten solder alloy to be cast directly, so that the solder occupies the space between the inside wall of the second portion 34 of the sleeve and the superconductors 14 and 16. By way of example, the orifice may be oblong in shape, as shown in FIGS. 2 to 4.

The solder material fills the space between the second portion 34 of the sleeve and the superconductors 14 and 16, at least in part. This material is electrically conductive and advantageously possesses a melting point that is relatively low, e.g. less than about 100° C. By way of example, it may be an alloy of Sn—Bi—Pb composition. This avoids damaging the superconductors by heating to too high a temperature, while also enabling a good electrical connection to be made between the superconductive layers and the sleeve 30.

The length of the sleeve is such that it covers the stripped portions 14 and 16 of the superconductors and the stripped portion 12 of the central support completely, going from the end 38 of the insulating sheath 18 and at least as far as the end 40 of the central support 12.

The sleeve 30 may include electrical contact means on the outside wall of its second portion 34, e.g. in the form of grooves 42 machined in the outside wall of the second portion 34 of the sleeve 30. These grooves serve to receive metal contact strips that are annular in shape.

The end 10 of the cable having the sleeve 30 fitted thereon (FIG. 3) can easily be connected to one end of a conventional resistive cable, e.g. formed by an electrically conductive tube that forms the female portion of the connection, with the sleeve 30 constituting the male portion.

In another embodiment shown in FIG. 4, the first portion 32 of the sleeve 30 comprises first and second elements 50 and 52 of cylindrical shape, the diameter of the first element 50 being smaller than the diameter of the second element 52. An intermediate portion 54 in the form of a truncated cone interconnects the two elements 50 and 52. The large base of the truncated cone 54 has the same diameter as the second element 52, and the small base of the truncated cone 54 has the same diameter as the first element 50, so that the transition between the section of the first element 50 and the larger section of the second element 52 takes place progressively. The first element 50 is hollow, and as above it can be fastened by mutual engagement on the stripped portion of the central support 12.

The second portion 34 is identical to the embodiment of FIGS. 2 and 3. The electric contact means on the outside wall of the second portion 34 of the sleeve are not of any use in this embodiment. As above, the first and second portions 32 and 34 of the sleeve are made of metal, e.g. of copper, which is optionally silver-plated.

The second element 52 may be connected to the end of a conventional cable.

The above-described termination presents numerous advantages. The connections made to the superconductor ends by soldering are easy to perform and do not damage the superconductors, whether by excessive heating or by bending, so they retain all their properties. The end of the cable can be connected or disconnected to a conventional cable without difficulty, which is advantageous when the resistive portion or the superconductive portion needs to be replaced. To undo the connection, it suffices to heat the termination to a temperature higher than the melting temperature of the solder material, and then the sleeve 30 can be removed. In addition, it is easy to assemble the sleeve to the stripped end of the superconductive cable in a manner that is easily reproducible. Similarly, in the event of a short circuit, the space in the sleeve that is filled with solder increases the cross-section available for conveying electric current.

Embodiments other than those described and shown can be devised by the person skilled in the art without going beyond the ambit of the present invention. For example, the embodiments described relate to a cable end having two superconductive layers. Naturally, the cable could have only one superconductive layer. Similarly, the presence of the intermediate layers such as 20, 22, and 24 is not essential.

The invention claimed is:

1. A termination for connecting one end of a superconductive cable to a conventional electrical conductor that is not superconductive, said end being made up of at least one resistively-conductive central support of substantially cylindrical shape, of a superconductor disposed around the support, and of an insulating sheath surrounding the superconductor, this end of the cable being stripped to reveal the superconductor, and a length of the stripped superconductor being removed so as to reveal the central support, said termination comprising:

a metal sleeve made up of two successive portions that are adjacent end to end, a first portion being engaged around the visible portion of the central support; and a second portion being soldered around the visible portion of the superconductor.

2. A termination according to claim 1, wherein the second portion of the sleeve includes an orifice enabling a solder material to be introduced into the space situated between the stripped portion of the superconductor and the inside wall of the second portion of the sleeve.

3. A termination according to claim 2, wherein the solder material has a relatively low melting point, less than 100° C.

4. A termination according to claim 3, wherein the solder material is an Sn—Bi—Pb alloy.

5. A termination according to claim 1, wherein the second portion of the sleeve includes electrical contact means on the outside surface of the sleeve.

6. A termination according to claim 5, wherein the electrical contact means are constituted by grooves of annular shape for receiving metal contact strips.

7. A termination according to claim 1, wherein the first portion of the sleeve comprises first and second elements of substantially cylindrical shape, the diameter of the second element being greater than the diameter of the first element, together with an intermediate portion of frustoconical shape situated between the first and second elements, the diameter of the large base of the frustoconical portion being substantially equal to the diameter of the second element, and the diameter of the small base of the frustoconical portion being substantially equal to the diameter of the first element, which first element is engaged around the stripped portion of the central support.

8. A termination according to claim 1, wherein the sleeve is made of copper.

9. A termination according to claim 8, wherein the sleeve is made of silver-plated copper.

10. A termination according to claim 1, wherein the superconductor is constituted by at least one layer of a superconductive tape wound around the central support.

*11. A metal sleeve for making a connection to an end of a superconductive cable, the sleeve comprising:*

*a portion substantially in the form of a hollow cylinder, wherein said portion includes an orifice enabling a solder material to be introduced into the space situated between a stripped portion of said superconductive cable on which the sleeve is to be engaged and an inside wall of said portion of the sleeve.*

*12. A sleeve according to claim 11, wherein said portion of the sleeve includes electrical contact means on its outside surface.*

*13. A sleeve according to claim 12, the electrical contact means are constituted by grooves of annular shape for receiving metal contact strips.*

*14. A sleeve according to claim 11, wherein said orifice is oblong in shape with a longitudinal axis parallel to the longitudinal axis of the sleeve.*

*15. A sleeve according to claim 11, wherein said sleeve is made of copper.*

*16. A sleeve according to claim 11, wherein said sleeve is silver-plated.*

*17. A termination for connecting one end of a superconductive cable by means of a sleeve according to claim 11, to a conventional electrical conductor that is not superconductive,*

*said end of a superconductive cable is made up of*

*at least one resistively-conductive central support of substantially cylindrical shape,*

*a superconductor disposed around the support, and*

*an insulating sheath surrounding the superconductor, this end of the cable being stripped to reveal the superconductor, and*

*a length of the stripped superconductor is removed so as to reveal the central support,*

*wherein said termination has*

*a metal sleeve made up of two successive portions that are adjacent end to end,*

*a first portion being engaged around the visible portion of the central support, and*

*said portion, called second portion, is soldered around the visible portion of the superconductor.*

*18. A termination according to claim 17, wherein the solder material has a relatively low melting point, less than 100° C.*

*19. A termination according to claim 18, wherein the solder material is an Sn—Bi—Pb alloy.*

*20. A termination according to claim 17, wherein the first portion of the sleeve has first and second elements of substantially cylindrical shape, the diameter of the second element is greater than the diameter of the first element, together with an intermediate portion of frustoconical shape situated between the first and second elements, the diameter of the large base of the frustoconical portion is substantially equal to the diameter of the second element, and the diameter of the small base of the frustoconical portion is substantially equal to the diameter of the first element, which first element is engaged around the stripped portion of the central support.*

*21. A termination according to claim 17, wherein the superconductor is constituted by at least one layer of a superconductive tape wound around the central support.*

* * * * *